(12) United States Patent
Sakuragi (10) Patent No.: US 10,196,216 B2
(45) Date of Patent: Feb. 5, 2019

(54) CONVEYOR BELT AND CONVEYOR BELT DEVICE

(71) Applicant: BRIDGESTONE CORPORATION, Tokyo (JP)

(72) Inventor: Akira Sakuragi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/523,546

(22) PCT Filed: Nov. 5, 2015

(86) PCT No.: PCT/JP2015/081203
§ 371 (c)(1),
(2) Date: May 1, 2017

(87) PCT Pub. No.: WO2016/072462
PCT Pub. Date: May 12, 2016

(65) Prior Publication Data
US 2017/0305683 A1    Oct. 26, 2017

(30) Foreign Application Priority Data

Nov. 5, 2014 (JP) ................. 2014-225293

(51) Int. Cl.
*B65G 15/08*  (2006.01)
*B65G 15/32*  (2006.01)
*B65G 43/02*  (2006.01)

(52) U.S. Cl.
CPC ............ *B65G 43/02* (2013.01); *B65G 15/08* (2013.01); *B65G 15/32* (2013.01); *B65G 2203/042* (2013.01); *B65G 2207/48* (2013.01)

(58) Field of Classification Search
CPC .................................................. B65G 43/02
(Continued)

(56) References Cited

U.S. PATENT DOCUMENTS 3,731,786 A * 5/1973 Nagata ............... B65G 43/02
198/810.02
3,834,518 A * 9/1974 Specht ............... B65G 43/02
174/128.1
(Continued)

FOREIGN PATENT DOCUMENTS

JP    49-089882 U1    8/1974
JP    2012-236677 A   12/2012
(Continued)

OTHER PUBLICATIONS

International Search Report for PCT/JP2015/081203 dated Feb. 9, 2016 [PCT/ISA/210].
(Continued)

*Primary Examiner* — William R Harp
(74) *Attorney, Agent, or Firm* — Sughrue Mion, PLLC (57) ABSTRACT

A conveyor belt includes a main body rubber which extends in a belt longitudinal direction and a loop coil which is embedded in the main body rubber and has an annular shape in a plan view when viewed in belt thickness direction, in which the loop coil includes wire portions which are disposed in a direction which extend in the plan view and in which end portions are joined by a joining portion. A pair of longitudinal portions extend in the belt longitudinal direction. A pair of width portions, which extend in a belt width direction, and a plurality of joining portions are disposed in the direction which extend in the plan view, and the number of the joining portions disposed in the longitudinal portion of the loop coil is greater than the number of the joining portions disposed in the width portion of the loop coil.

19 Claims, 5 Drawing Sheets

(58) Field of Classification Search
USPC .................................................. 198/810.02
See application file for complete search history.

(56) References Cited

U.S. PATENT DOCUMENTS

| | | | | | |
|---|---|---|---|---|---|
| 4,087,800 | A | * | 5/1978 | Lee | B65G 43/02 |
| | | | | | 198/810.02 |
| 4,621,727 | A | * | 11/1986 | Strader | B65G 43/02 |
| | | | | | 198/810.02 |
| 4,854,446 | A | * | 8/1989 | Strader | B65G 43/02 |
| | | | | | 198/810.02 |
| 5,168,266 | A | * | 12/1992 | Fukuda | B65G 43/02 |
| | | | | | 198/10.02 |
| 6,352,149 | B1 | * | 3/2002 | Gartland | B65G 43/02 |
| | | | | | 198/810.02 |
| 9,221,610 | B2 | * | 12/2015 | Enshu | B65G 15/32 |
| 2004/0149049 | A1 | * | 8/2004 | Kuzik | B65G 43/02 |
| | | | | | 73/862.453 |
| 2014/0131176 | A1 | | 5/2014 | Minkin | |
| 2015/0203299 | A1 | | 7/2015 | Enshu | |

FOREIGN PATENT DOCUMENTS

| | | |
|---|---|---|
| JP | 2014-028682 A | 2/2014 |
| JP | 2014-031241 A | 2/2014 |

OTHER PUBLICATIONS

Written Opinion for PCT/JP2015/081203 dated Feb. 9, 2016 [PCT/ISA/237].

\* cited by examiner

CONVEYOR BELT AND CONVEYOR BELT DEVICE

CROSS REFERENCE TO RELATED APPLICATIONS

This application is a National Stage of International Application No. PCT/JP2015/081203 filed Nov. 5, 2015, claiming priority based on Japanese Patent Application No. 2014-225293 filed Nov. 5, 2014, the contents of all of which are incorporated herein by reference in their entirety.

TECHNICAL FIELD

Background Art

In the related art, a conveyor belt device which can detect a vertical tear of a conveyor belt is known (for example, refer to Patent Document 1).

This conveyor belt device includes a conveyor belt in which a loop coil having an annular shape in a plan view when viewed in a belt thickness direction is embedded in a main body rubber extending in a belt longitudinal direction, a magnetic field generation portion which generates a magnetic field generating induction current in the loop coil, and a detection portion which detects the induction current generated in the loop coil. In addition, in the conveyor belt device, if the vertical tear is generated in the conveyor belt and the loop coil is ruptured, the induction current generated in the loop coil when a magnetic field is generated from the magnetic field generation portion is changed, and the vertical tear of the conveyor belt is detected by the detection portion.

CITATION LIST

Patent Document

[Patent Document 1] Japanese Unexamined Patent Application, First Publication No. 2012-236677

SUMMARY OF INVENTION

Technical Problem

However, in the conveyor belt device of the related art, in the course of its use, a state where the conveyor belt is supported by a trough and is bent in a belt width direction and a state where the conveyor belt is flat are repeated, and the joining portion of the loop coil is likely to be ruptured even in a state where the vertical tear is not generated in the main body rubber.

Accordingly, an object of the present invention is to provide a conveyor belt and a conveyor belt device in which it is possible to decrease rupture in the joining portion of the loop coil in a state where the vertical tear is not generated in the main body rubber.

Solution to Problem

In order to achieve the object, according to an aspect of the present invention, there is provided a conveyor belt, including: a main body rubber which extends in a belt longitudinal direction; and a loop coil which is embedded in the main body rubber and has an annular shape in a plan view when viewed in belt thickness direction, in which the loop coil includes a plurality of wire portions which are disposed in a direction which annularly extends in the plan view and in which end portions are joined to each other via a joining portion, a pair of longitudinal portion which extends in the belt longitudinal direction, and a pair of width portions which extends in a belt width direction, and a plurality of joining portions are disposed in the direction which annularly extends in the plan view, and the number of the joining portions disposed in the longitudinal portion of the loop coil is greater than the number of the joining portions disposed in the width portion of the loop coil.

Advantageous Effects of Invention

According to the present invention, since the number of the joining portions disposed in the longitudinal portion of the loop coil is greater than the number of the joining portions disposed in the width portion thereof, it is possible to decrease rupture in the joining portion of the loop coil by a force in the belt width direction which acts on the loop coil due to bending deformation of the conveyer belt in the belt width direction.

Accordingly, the rupture of the loop coil is decreased in a state where a vertical tear is not generated in the main body rubber, and it is possible to prevent the vertical tear of the conveyor belt from being erroneously detected.

Moreover, it is possible to further decrease the rupture in the joining portion by defining an arrangement direction of wave-shaped loop coils and the ratio between the lengths of deflection widths.

DESCRIPTION OF EMBODIMENTS

First Embodiment

Hereinafter, a conveyor belt and a conveyor belt device according to a first embodiment of the present invention will be described with reference to FIGS. 1 to 5.

Figure 1:
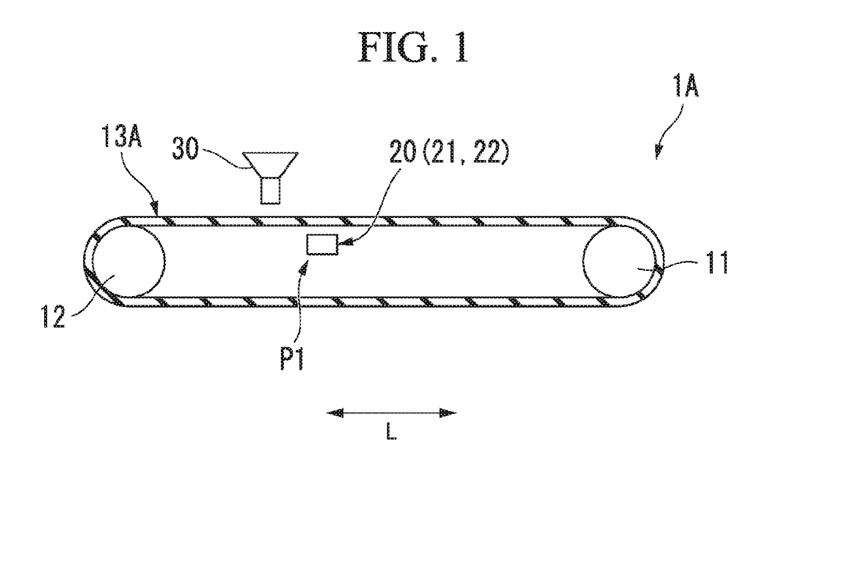
FIG. 1 is a side view of a conveyor belt device according to a first embodiment.

As shown in FIG. 1, a conveyor belt device 1A according to the first embodiment includes a pair of pulleys 11 and 12 which is disposed to be separated from each other in a horizontal direction and is rotatable around rotary shafts. In addition, the conveyor belt device 1A includes an endless belt-shaped conveyor belt 13A which is wound between both pulleys 11 and 12 and a vertical tear detection means 20 for detecting a vertical tear of the conveyor belt 13.

Figure 2:
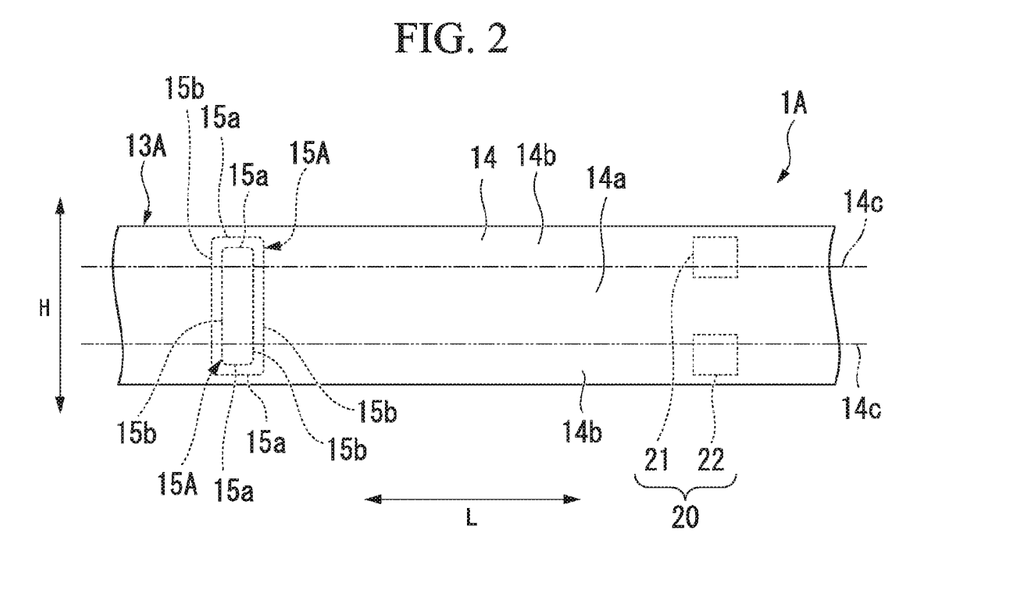
FIG. 2 is a plan view when a portion of a conveyor belt of the conveyor belt device shown in FIG. 1 is viewed from above.

The pair of pulleys 11 and 12 includes a drive pulley 11 and a driven pulley 12, and rotary shafts of the pulleys 11 and 12 are parallel to each other and extend in a belt width direction H (refer to FIG. 2 and a direction orthogonal to a paper surface in FIG. 1).

Figure 3:
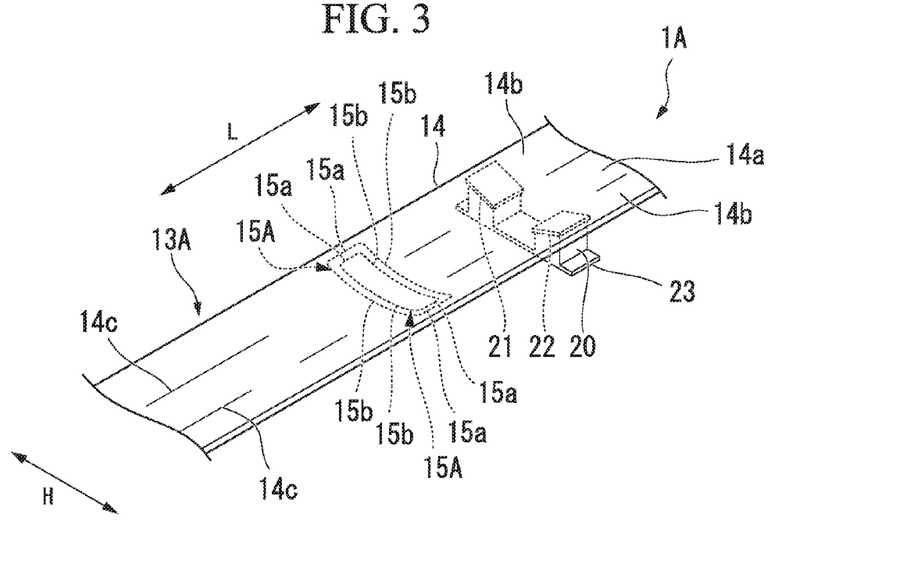
FIG. 3 is a perspective view of the conveyor belt device shown in FIG. 2.

As shown in FIGS. 2 and 3, the conveyor belt 13A includes a main body rubber 14 which extends in a belt longitudinal direction L and loop coils 15A which are embedded in the main body rubber 14.

For example, the main body rubber 14 is formed of a sulfur-vulcanizable rubber material. For example, as the rubber material, natural rubber (NR), isoprene rubber (IR), butadiene rubber (BR), styrene-butadiene copolymer rubber (SBR) and the like may be used alone or in combination.

In addition, a tension member (not shown) is embedded in the main body rubber 14 over the entire circumference in the belt longitudinal direction L as necessary.

Figure 4:
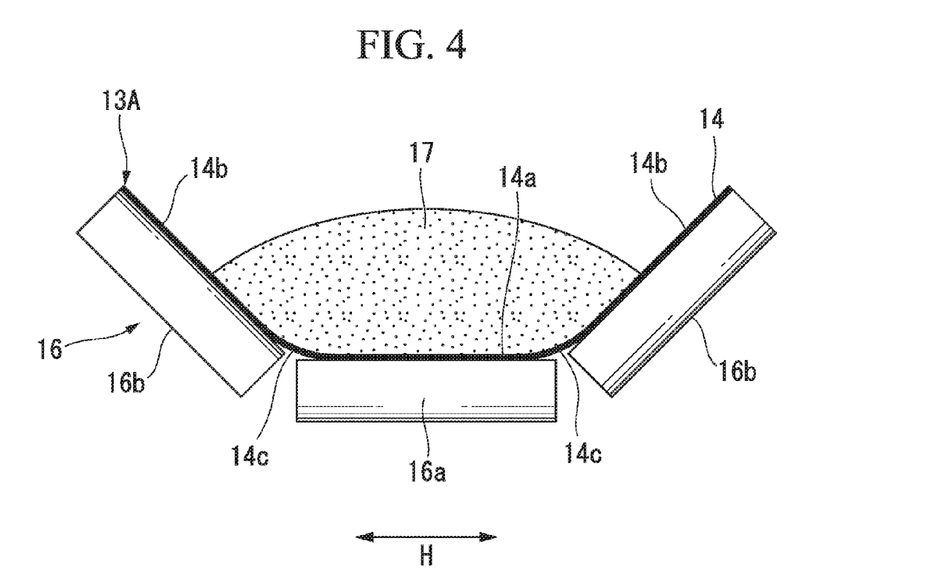
FIG. 4 is a view showing the conveyor belt.

Here, as shown in FIG. 4, the carrier-side conveyor belt 13A in which a surface faces vertically upward travels between the drive pulley 11 (refer to FIG. 1) and the driven pulley 12 (refer to FIG. 1) in a state where the conveyor belt 13A is supported in a trough shape bent and deformed in the belt width direction H by plurality of belt support means 16 disposed in the belt longitudinal direction L.

The belt support means 16 is rotatably disposed around a rotary shaft extending in the belt width direction H at the intermediate portion in the belt width direction H, and includes a center roller 16a which supports an intermediate bottom wall portion 14a in the belt width direction H of the main body rubber 14. Moreover, the belt support means 16 includes a pair of side rollers 16b and 16b which is rotatably disposed around rotary shafts inclined with respect to the rotary shaft of the center roller 16a on both side of the center roller 16a in the belt width direction H and supports side wall portions 14b and 14b on both end sides of the main body rubber 14 in the belt width direction H.

In the carrier-side conveyor belt 13A which is supported in a trough shape by the belt support means 16, the bottom wall portion 14a of the main body rubber 14 abuts on the center roller 16a and extends in the belt width direction H when viewed in the belt longitudinal direction L, and the pair of side wall portions 14b and 14b respectively abuts on the side rollers 16b and 16b and gradually extends upward in a vertical direction from the inside in the belt width direction H toward the outside when viewed in the belt longitudinal direction L.

Here, the pair of the side wall portions 14b and 14b of the main body rubber 14 is connected to the bottom wall portion 14a, and portions of the conveyor belt 13A which are bent when the conveyor belt 13A is supported in trough shape become bent portions 14c and 14c.

Moreover, the loop coil 15A is embedded over the bottom wall portion 14a and the side wall portions 14b and 14b of the main body rubber 14 (details will be described later). In addition, the conveyor belt 13A becomes a carrier side and is supported in a trough shape by the belt support means 16. A portion of the loop coil 15A which is embedded in the bottom wall portion 14a of the main body rubber 14 extends in the belt width direction H when viewed in the belt longitudinal direction L, and a portion of the loop coil 15A which is embedded in the pair of side wall portions 14b and 14b gradually extends upward in a vertical direction from the inside in the belt width direction H toward the outside when viewed in the belt longitudinal direction L.

As shown in FIG. 1, in a return-side conveyor belt 13A in which the surface faces vertically downward, the main body rubber 14 and the loop coil 15A travel in a state of being flatly developed in the belt width direction H.

In this way, in the course of the use of the conveyor belt 13A, a state where the conveyor belt 13A is bent and deformed in a trough shape in the belt width direction H and a state where the conveyor belt 13A is flatly developed in the belt width direction H are repeated.

The carrier-side conveyor belt 13A which is bent and deformed in the trough shape in the belt width direction H transports a transport object 17 (refer to FIG. 4) loaded on the conveyor belt 13A from the driven pulley 12 side toward the drive pulley 11 side. A hopper 30 through which the transport object 17 is dropped on the surface of the conveyor belt 13A is provided above the carrier-side conveyor belt 13A. The carrier-side conveyor belt 13A transports the transport object 17 dropped from the hopper 30 to an unloading portion (not shown) which is provided on the drive pulley 11 side.

As shown in FIG. 2, a plurality of loop coil 15A are arranged in the main body rubber 14 at intervals in the belt longitudinal direction L and are embedded in the rear surface side of the main body rubber 14 in the belt thickness direction (direction orthogonal to a paper surface of FIG. 2). Each of the loop coils 15A is formed in a rectangular annular shape elongated in the belt width direction H in a plan view when viewed in the belt thickness direction. In the present embodiment, the loop coils 15A are disposed in a dual manner on the inner peripheral side and the outer peripheral side spaced apart from each other in a plan view when viewed in the belt thickness direction.

The loop coils 15A includes a pair of longitudinal portions 15a and 15a which is a portion extending in the belt longitudinal direction L in a plan view when viewed in the belt thickness direction and a pair of width portions 15b and 15b which is a portion extending in the belt width direction H. In addition, the loop coil 15A is formed such that the lengths in the extension directions of the longitudinal portions 15a and 15a are shorter than lengths in the extension directions of the width portions 15b and 15b.

Moreover, in the pair of longitudinal portions 15a and 15a of the loop coil 15A, one longitudinal portion 15a is embedded in one side wall portion 14b of the pair of side wall portions 14b and 14b of the main body rubber 14, and the other longitudinal portion 15a is embedded in the other side wall portion 14b.

Moreover, each of the pair of width portions 15b and 15b of the loop coil 15A is embedded in the approximately entire main body rubber 14 in the belt width direction H, intermediate portions in the extension directions of the width portions 15b and 15b are embedded in the bottom wall portion 14a of the main body rubber 14, and both end portion sides are respectively embedded in the side wall portions 14b and 14b of the main body rubber 14.

Figure 5:
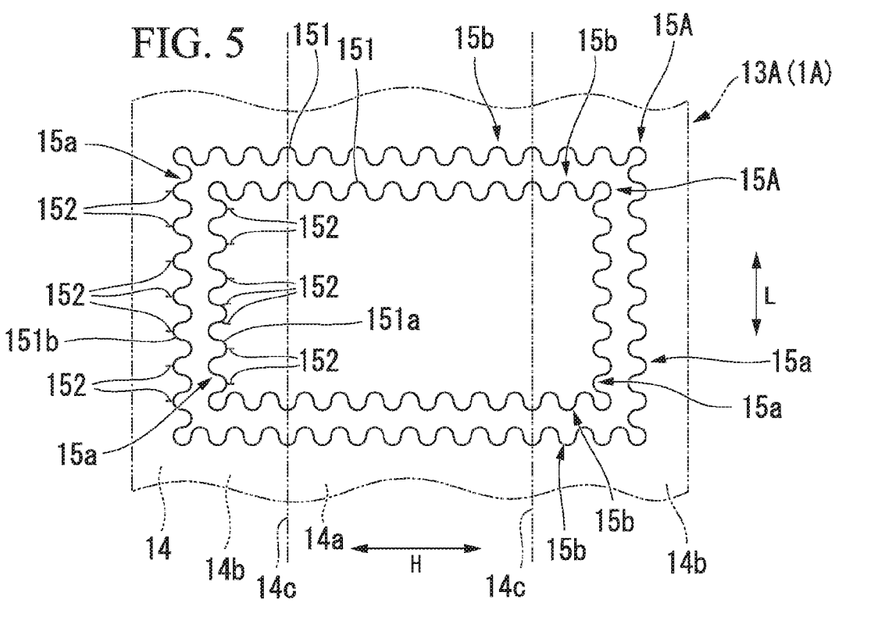
FIG. 5 is a view showing a loop coil.

As shown in FIG. 5, the loop coil 15A includes a plurality of wire portions 151 which are disposed in the direction extending in a rectangular annular shape in a plan view when viewed in the belt thickness direction (direction orthogonal to a paper surface of FIG. 5), and both end portions of respective wire portions 151 are joined to each other via joining portions 152. In the loop coil 15A of the present embodiment, seven wire portions 151 are twisted to form a rectangular annular shape and seven joining portions 152 are formed.

In addition, the wire portions 151 extend in a rectangular annular shape while being bent so as to exhibit a wave shape in a plan view when viewed in the belt thickness direction.

In addition, the wire portion 151 is formed in a stranded shape in which a plurality of wires are twisted by an eye-splicing twisting, an eye-splicing processing, or the like.

Moreover, in the joining portion 152, both end portions of the wire portion 151 are twisted, and the twisted portions (joining portion 152) are formed in approximately straight lines and extend in the directions intersecting the direction extending in the rectangular annular shape in a plan view when viewed in the belt thickness direction.

In the present embodiment, in a plan view when viewed in the belt thickness direction, the joining portion 152 of the loop coil 15A disposed on the inner peripheral side extends from a protrusion portion 151a which protrudes toward the inside of the annular shape of the wave-shaped loop coil 15A exhibited by the wire portions 151 toward the inside of the annular shape of the loop coil 15A, and the joining portion 152 of the loop coil 15A disposed on the outer peripheral side extends from a protrusion portion 151b which protrudes toward the outside of the annular shape of the wave-shaped loop coil 15A exhibited by the wire portion 151 toward the outside of the annular shape of the loop coil 15A.

Accordingly, the joining portion 152 of the loop coil 15A disposed on the inner peripheral side and the joining portion 152 of the loop coil 15A disposed on the outer peripheral side are disposed to be separated from each other.

In addition, as shown in FIG. 5, all the joining portions 152 are disposed in one longitudinal portion 15a in the loop coil 15A, and the joining portion 152 is not disposed in the other longitudinal portion 15a and the pair of width portions 15b and 15b. Accordingly, the joining portions 152 are embedded in one side wall portion 14b of the pair of side wall portions 14b and 14b of the main body rubber 14.

As shown in FIGS. 2 and 3, the vertical tear detection means 20 includes a magnetic field generation portion 21 which generates a magnetic field that causes induction current in the loop coil 15A and generates a magnetic field and a detection portion 22 which detects the induction current generated in the loop coil 15A. The magnetic field generation portion 21 and the detection portion 22 are separated from each other in the belt width direction H on the rear surface side of the conveyor belt 13A, one thereof is disposed at a position close to one end portion side of the conveyor belt 13A in the belt width direction H, and the other thereof is disposed at a position close to the other end portion side of the conveyor belt 13A in the belt width direction H.

In addition, the magnetic field generation portion 21 and the detection portion 22 face the rear surface of the conveyor belt 13A. Moreover, in the present embodiment, as shown in FIG. 3, the magnetic field generation portion 21 and the detection portion 22 are integrally fixed to each other by a frame 23.

As shown in FIG. 2, in a belt path through which the carrier-side conveyor belt 13A passes, the vertical tear detection means 20 is disposed at a transport start position P1 adjacent from the drive pulley 11 side in the belt longitudinal direction L with respect to the hopper 30. In addition, a plurality of vertical tear detection means 20 may be disposed in the belt path through which the conveyor belt 13A passes, and for example, the vertical tear detection means 20 may be disposed at a return start position adjacent from the driven pulley 12 side with respect to the drive pulley 11 in a belt path through which the return-side conveyor belt 13A passes.

The magnetic field generation portion 21 includes an oscillation circuit (not shown) which generates a high-frequency magnetic field (for example, approximately 15 kHz), and oscillates the high-frequency magnetic field toward the conveyor belt 13A. If the loop coil 15A approaches the high-frequency magnetic field, induction current is generated in the loop coil 15A by an electromagnetic induction phenomenon.

The detection portion 22 includes a receiving coil (not shown) in which an induced electromotive force is generated by the induction current generated in the loop coil 15A. The detection portion 22 detects the induction current generated in the loop coil 15A from the rear surface side of the conveyor belt 13A by the receiving coil. In addition, a determination unit (not shown) which determines presence or absence of vertical tear of the conveyor belt 13A on the basis of the induced electromotive force generated in the receiving coil is connected to the detection portion 22.

In the above-described conveyor belt device 1A, when a portion of the conveyor belt 13A in which the loop coil 15A is embedded passes through the transport start position P1, if the loop coil 15A is not cut, induction current is generated in the loop coil 15A by the high-frequency magnetic field oscillated by the magnetic field generation portion 21. Meanwhile, if vertical tear is formed in the conveyor belt 13A and the loop coil 15A is cut, induction current is not generated in the loop coil 15A. Accordingly, the determination unit determines presence or absence of the induction current or the magnitude of the induction current in the loop coil 15A on the basis of the induced electromotive force generated in the detection portion 22, and the vertical tear of the conveyor belt 13A is detected.

Next, operations and effects of the conveyor belt 13A and the conveyor belt device 1A according to the above-described first embodiment will be described with reference to the drawings.

In the present embodiment, in the loop coil 15A, since the joining portions 152 are not disposed in the width portion 15b which easily follows bending deformation of the conveyor belt 13A in the belt width direction H and all the joining portions 152 are disposed in the longitudinal portion 15a which does not easily follow the bending deformation, it is possible to cause the joining portions 152 to be difficult to receive a load due to the bending deformation of the conveyor belt 13A. Accordingly, it is possible to decrease rupture in the joining portions 152 of the loop coil 15A in a state where the vertical tear is not generated in the main body rubber 14, and it is possible to prevent the vertical tear of the conveyor belt 13A from being erroneously detected.

In addition, in the joining portion 152, since both end portions of the wire portion 151 are twisted and extend in the direction orthogonal to the direction extending in an annular shape in a plan view, the size of the joining portion 152 in the belt thickness direction does not excessively increase, and it is possible to easily form the loop coil 15A.

In addition, the joining portion 152 of the loop coil 15A disposed on the inner peripheral side extends from the protrusion portion which protrudes toward the inside of the annular shape of the wave-shaped loop coil 15A exhibited by the wire portions 151 toward the inside of the annular shape of the loop coil 15A in a plan view when viewed in the belt thickness direction. The joining portion 152 of the loop coil 15A disposed on the outer peripheral side extends from the protrusion portion which protrudes toward the outside of the annular shape of the wave-shaped loop coil 15A exhibited by the wire portions 151 toward the outside of the annular shape of the loop coil 15A. Accordingly, the joining portion 152 of the loop coil 15A disposed on the inner peripheral side and the joining portion 152 of the loop coil 15A disposed on the outer peripheral side are disposed so as to be separated from each other. In addition, a short circuit between the joining portion 152 of the loop coil 15A disposed on the inner peripheral side and the joining portion 152 of the loop coil 15A disposed on the outer peripheral side is prevented, and it is possible to prevent the vertical tear of the conveyor belt 13A from being erroneously detected.

In addition, in the loop coil 15A, the length of the longitudinal portion 15a is shorter than the length of the width portion 15b in a plan view when viewed in the belt thickness direction. Accordingly, in the conveyor belt 13A, it is possible to form the loop coil 15A which can detect the vertical tear over a wide range in the belt width direction H without excessively increasing the length of the loop coil 15A in the direction which annularly extends in a plan view, that is, the peripheral length thereof. Accordingly, since it is possible to prevent an electric resistance of the loop coil 15A which can detect the vertical tear over the wide range in the belt width direction H from excessively increasing, it is possible to prevent detection accuracy with respect to the vertical tear of the conveyor belt 13A from deteriorating.

Moreover, since the wire portion 151 annularly extends while being bent so as to exhibit a wave shape in a plan view when viewed in the belt thickness direction, the wire portion 151 can have flexibility. Accordingly, it is possible to decrease a load applied to the wire portion 151 due to the bending deformation of the conveyor belt 13A.

Second Embodiment

Next, another embodiment will be described with reference to the accompanying drawings. For the members or portions which are the same as or similar to those of the first embodiment, the same reference numerals are used and the descriptions thereof are not repeated, and configurations different from those of the first embodiment are described.

Figure 6:
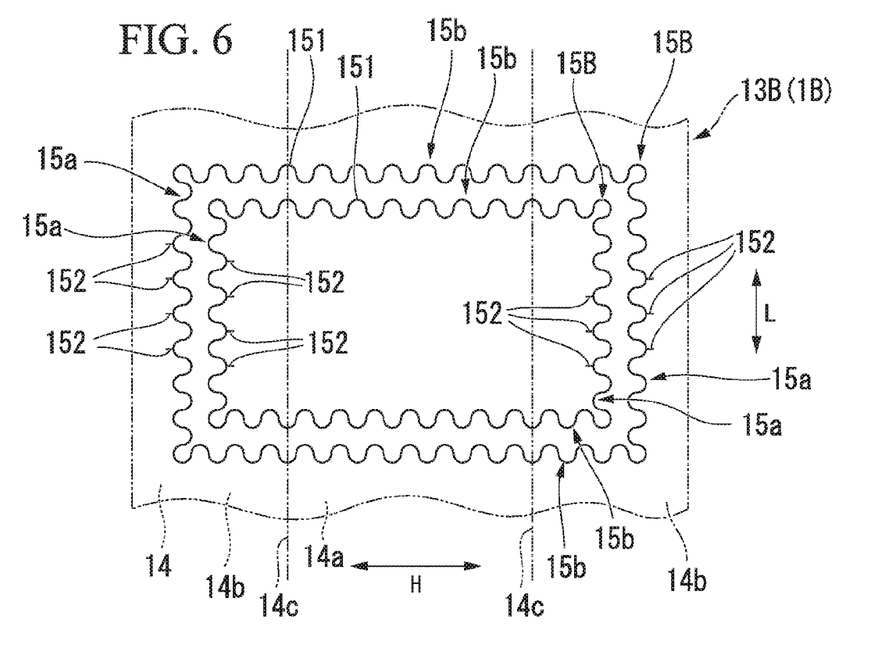
FIG. 6 is a view showing a conveyor belt of a conveyor belt device according to a second embodiment.

As shown in FIG. 6, in a conveyor belt 13B and a conveyor belt device 1B according to the second embodiment, the joining portions 152 of a loop coil 15B of the conveyor belt 13B are disposed in the pair of longitudinal portions 15a and 15a of the loop coil 15B. Also in the present embodiment, one loop coil 15B includes seven wire portions 151, and seven joining portions 152 are formed. In addition, a total of the number of the joining portions 152 disposed in one longitudinal portion 15a of the loop coil 15B and the number of the joining portions 152 disposed in the other longitudinal portion 15a is seven.

Moreover, the joining portions 152 are not disposed in the pair of width portions 15b and 15b of the loop coil 15B.

In the conveyor belt 13B and the conveyor belt device 1B according to the second embodiment, even in a case where all the joining portions 152 cannot be disposed in one longitudinal portion 15a of the loop coil 15B, since the joining portions 152 may not be disposed in the width portion 15b if the joining portions 152 are disposed in both longitudinal portions 15a and 15a, effects similar to those of the first embodiment are exerted.

In addition, even in a case where the number of the joining portions 152 of the loop coil 15B is large or even in a case where a portion of the longitudinal portion 15a in which the joining portions 152 can be disposed is small, the joining portions 152 are disposed in both of the pair of longitudinal portions 15a and 15a. Accordingly, it is possible to realize a shape in which the joining portions 152 are not disposed in the width portions 15b.

Third Embodiment

Figure 7:
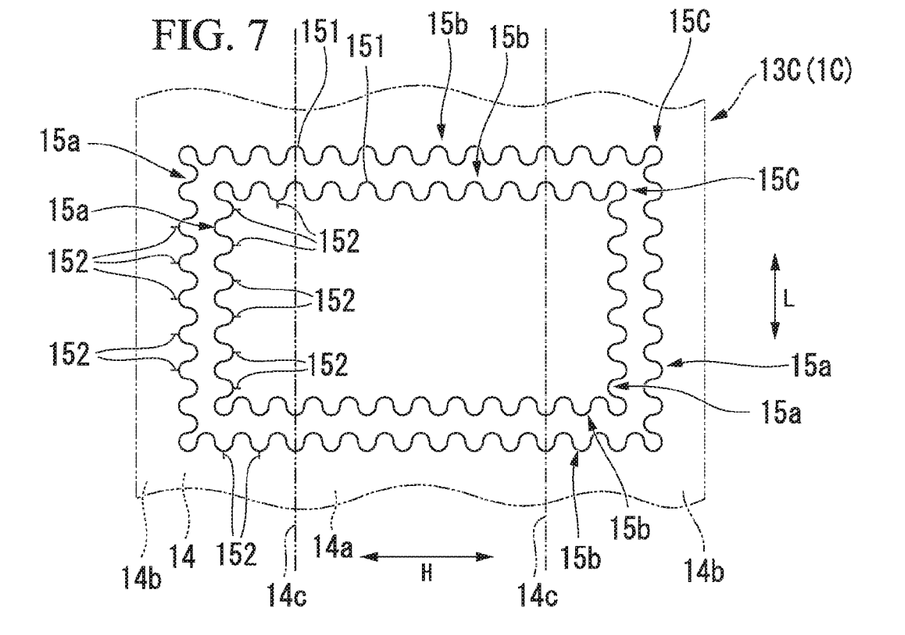
FIG. 7 is a view showing a conveyor belt of a conveyor belt device according to a third embodiment.

As shown in FIG. 7, in a conveyor belt 13C and a conveyor belt device 1C according to the third embodiment, the joining portions 152 of a loop coil 15C of the conveyor belt 13C are disposed in one longitudinal portion 15a and one width portion 15b of the loop coil 15C.

The number of the joining portions 152 disposed in one longitudinal portion 15a is greater than the number of the joining portions 152 disposed in one width portion 15b. Also in the present embodiment, one loop coil 15C includes seven wire portions 151, and seven joining portions 152 are formed. In addition, a total of the number of the joining portions 152 disposed in one longitudinal portion 15a of the loop coil 15C and the number of the joining portions 152 disposed in the one width portion 15b is seven.

In addition, the joining portions 152 disposed in one width portion 15b of the loop coil 15C are disposed near an outer end portion of one width portion 15b and are embedded in the side wall portion 14b of the main body rubber 14. Moreover, the joining portions 152 disposed in one width portion 15b of the loop coil 15C are disposed at a position which avoids the bent portions 14c and 14c.

In the conveyor belt 13C and the conveyor belt device 1C according to the third embodiment, the number of the joining portions 152 disposed in the longitudinal portion 15a of the loop coil 15C which does not easily follow the bending deformation in the belt width direction H of the conveyor belt 13C is greater than the number of the joining portions 152 disposed in the width portion 15b of the loop coil 15C which easily follows the bending deformation. Accordingly, it is possible to decrease the number of the joining portions 152 which receive the load due to the bending deformation of the conveyor belt 13C. Therefore, it is possible to decrease rupture in the joining portions 152 of the loop coil 15C in a state where the vertical tear is not generated in the main body rubber 14, and it is possible to prevent the vertical tear of the conveyor belt 13C from being erroneously detected Moreover, since the joining portions 152 are disposed at positions which avoid the bent portion 14c and the loop coil 15C is not bent and deformed in the joining portions 152, it is possible to decrease rupture in the joining portions 152 of the loop coil 15C due to the load of the bending deformation.

In addition, since the joining portions 152 disposed in one width portion 15b of the loop coil 15C are disposed near the outer end portion of one width portion 15b, it is possible to easily manufacture the loop coil 15C.

Fourth Embodiment

Figure 8:
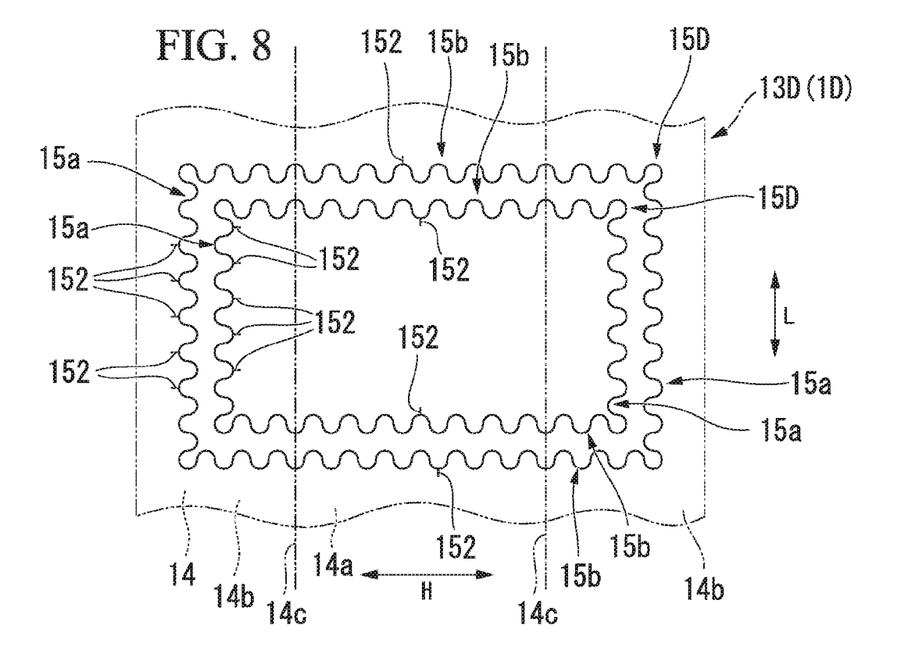
FIG. 8 is a view showing a conveyor belt of a conveyor belt device according to a fourth embodiment.

As shown in FIG. 8, in a conveyor belt 13D and a conveyor belt device 1D according to a fourth embodiment, the joining portions 152 of a loop coil 15D of the conveyor belt 13D are disposed in one longitudinal portion 15a and one width portion 15b of the loop coil 15D.

The number of the joining portions 152 disposed in one longitudinal portion 15a is greater than the number of the joining portions 152 disposed in one width portion 15b. Also in the present embodiment, one loop coil 15D includes seven wire portions 151, and seven joining portions 152 are formed. In addition, a total of the number of the joining portions 152 disposed in one longitudinal portion 15a of the loop coil 15D and the number of the joining portions 152 disposed in one width portion 15b is seven.

Moreover, the joining portions 152 disposed in one width portion 15b of the loop coil 15D are embedded in the bottom wall portion 14a of the main body rubber 14. In addition, the joining portions 152 disposed in one width portion 15b of the loop coil 15D are embedded in the vicinity of the center portion of the main body rubber 14 in the belt width direction H. In addition, the vicinity of the center portion of the main body rubber 14 in the belt width direction H is not only a correct center portion in the belt width direction H but also is a region which includes a position slightly deviated from the correct center portion.

Similarly to the third embodiment, in the conveyor belt 13D and the conveyor belt device 1D according to the fourth embodiment, the number of the joining portions 152 disposed in the width portion 15b of the loop coil 15D is smaller than the number of the joining portions 152 disposed in the longitudinal portion 15a. Accordingly, compared to a case where the number of the joining portions 152 disposed in the width portion 15b is greater than the number of the joining portions 152 disposed in the longitudinal portion 15a, it is possible to decrease rupture of the joining portions 152.

Moreover, even when the conveyor belt 13D is repeatedly bent and deformed in the belt width direction H, the joining portions 152 disposed in the width portion 15b of the loop coil 15D is disposed in the vicinity of the center portion of the bottom wall portion 14a in the belt width direction H which is hardly bent and deformed. Accordingly, the load applied to the joining portion 152 decreases, and it is possible to prevent the joining portions 152 disposed in the width portion 15b from being ruptured.

Figure 9:
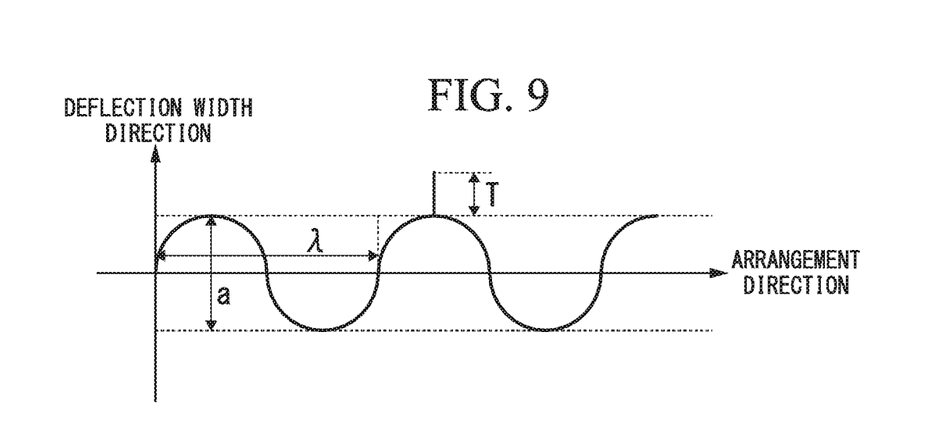
FIG. 9 is a view showing a wave-shaped loop coil.

In addition, as shown in FIG. 9, in a case where a direction in which the coils are arranged, that is, a direction which is approximately parallel to the longitudinal direction L or the width direction H is defined as an arrangement direction and a direction orthogonal to the arrangement direction is defined as a deflection width direction, each of the loop coils 15A to 15D is repeatedly curved at an approximately constant pitch in the arrangement direction, and the size thereof in the deflection width direction is approximately constant. Here, a pitch in the arrangement direction is defined as X, the size in the deflection width direction is defined as a deflection width a, and the deflection width a with respect to the pitch $\lambda$ is defined as $a/\lambda$. In the case of the present embodiment, the deflection width a is approximately 5 mm to 20 mm, and the pitch $\lambda$ is approximately 30 mm to 50 mm. Moreover, in FIG. 9, the joining portion 152 extends in the belt longitudinal direction or the width direction, and a protrusion amount thereof is defined as T.

Next, loop coils in which the pitch X was set to be unchanged and the deflection width a and the protrusion amount T were variously changed were embedded in belts, and traveling test was performed. The belt passed through a pulley more than 2,000,000 times, and endurance test indicating bending fatigue was performed to the loop coils. After the test, the belt was dismantled, and the number of rupture of the joining portion was visually confirmed.

TABLE 1

| Disposition position of joining portion | $a/\lambda$ | Protrusion amount T (mm) | Endurance test result |
|---|---|---|---|
| Width portion of loop coil | 0.25 | 2 | C |
| Longitudinal portion of loop coil | 0.25 | 2 | B |
| | 0.29 | 2 | B |
| | 0.31 | 0.2 | A |
| | 0.31 | 0.5 | A |
| | 0.31 | 1 | A |
| | 0.31 | 2 | A |
| | 0.31 | 2.5 | A |
| | 0.31 | 5 | B |
| | 0.36 | 2 | A |

Table 1 shows a result of the endurance test. 'A' indicates that breakages were not detected, 'B' indicates that one or two breakage were detected in the joining portion, and 'C' indicates that three or more breakages were detected in the joining portion.

According to the result of the endurance test shown in Table 1, in a case where the joining portions 152 are disposed in the longitudinal portion of the loop coil, more preferably, a value of $a/\lambda$ of the loop coil is 0.31 or more. In a case where the value of $a/\lambda$ is less than 0.31, the number of breakages of the joining portions 152 are likely to increase. Accordingly, as described above, it is possible to more preferably control the rupture of the loop coils 15A to 15D by limiting the value of $a/\lambda$ of the loop coil. In addition, if the value of $a/\lambda$ excessively increases, since compression is applied to the loop coil due to deformation of the conveyor belt, preferably, the value of $a/\lambda$ is 3.0 or less.

Moreover, from Table 1, in a case where the value of $a/\lambda$ is 0.31 or more, preferably, the value of protrusion amount T is 0.5 mm to 2.5 mm, and more preferably, the value of protrusion amount T is 1 mm to 2 mm. In a case where the protrusion amount T is less than 0.5 mm, the twist of the eye-splicing twisting forming the joining portion 152 is likely to be easily loosened, and if the protrusion amount T is more than 2 mm, the breakage frequency of the joining portion 152 is likely to increase.

Moreover, from Table 1, in a case where the joining portion 152 is disposed in the width portion of the loop coil, the value of $a/\lambda$ is 0.25, and even when the protrusion amount T is 2 mm, it is understood that the number of breakages of the joining portion 152 increases. Accordingly, more the joining portions 152 being disposed in the longitudinal portion of the loop coil than in the width portion thereof can decrease the number of breakages.

Hereinbefore, embodiments of the conveyor belt and the conveyor belt device according to the present invention are described. However, the present invention is not limited to the above-described embodiments, and may be appropriately modified within a scope which does not depart from the gist.

For example, in the above-described embodiments, the joining portions 152 are disposed in one longitudinal portion 15a or both longitudinal portions 15a of the loop coil 15, or are disposed in one longitudinal portion 15a and one width portion 15b. However, as long as the number of the joining portions 152 disposed in the longitudinal portion 15a is greater than the number of the joining portions 152 disposed in the width portion 15b, the joining portions 152 may be disposed in one longitudinal portion 15a or both longitudinal portions 15a of the loop coil 15 and both width portions 15b thereof, or may be disposed in both longitudinal portions 15a and one width portion 15b.

Moreover, in the above-described third embodiment, the joining portions 152 disposed in the width portion 15b of the loop coil 15C are disposed in the vicinity of the outer end portion of the width portion 15b and are embedded in the side wall portion 14b which avoids the bent portion 14c of the main body rubber 14. Meanwhile, in the fourth embodiment, the joining portions 152 are embedded in the vicinity of the center portion of the bottom wall portion 14a of the main body rubber 14 in the belt width direction H. However, the joining portion 152 may be embedded at a position overlapping the bent portion 14c of the main body rubber 14 or may be embedded in side portions of the bottom wall portion 14a in the belt width direction H.

Moreover, in the above-described embodiments, the joining portion 152 has the aspect in which both end portions of the wire portion 151 are twisted and joined to each other. However, for example, in addition to the aspect, the joining portion 152 may have an aspect in which both end portions of the wire portion 151 are joined to each other by a method of connecting steel cords, welding, or a joining method using a metal fitting.

In addition, in the above-described embodiments, the joining portion 152 extends in the direction intersecting the direction which annularly extends in a plan view. However, the extension direction of the joining portion 152 may be appropriately set, and the joining portion 152 may not extend in an arbitrary direction.

Moreover, in the above-described embodiments, each of the loop coils 15A to 15D includes seven wire portions 151, and seven joining portions 152 and 152 are formed. However, the number of the wire portions 151 or the joining portions 152 may be appropriately set.

In addition, in the above-described embodiments, in each of the loop coils 15A to 15D, the length of the longitudinal portion 15a is shorter than the length of the width portion 15b in a plan view. However, the length of the longitudinal portion 15a may be longer than the length of the width portion 15b or the lengths of the longitudinal portion 15a and the width portion 15b may be the same as each other.

Moreover, in the above-described embodiments, the wire portion 151 annularly extends while being bent so as to exhibit a wave shape in a plan view. However, the wire portion 151 may not have this shape and may not be bent.

Moreover, in the above-described embodiments, the joining portions 152 of each of the loop coils 15A to 15D disposed on the inner peripheral side extend from the protrusion portion which protrudes toward the inside of the annular shape of the wave-shaped loop coils 15A to 15D exhibited by the wire portions 151 toward the inside of the annular shape of each of the loop coils 15A to 15D in a plan view when viewed in the belt thickness direction. The joining portions 152 of each of the loop coils 15A to 15D disposed on the outer peripheral side extend from the protrusion portion which protrudes toward the outside of the annular shape of each of the wave-shaped loop coils 15A to 15D exhibited by the wire portions 151 toward the outside of the annular shape of each of the loop coils 15A to 15D. However, the disposition positions of the joining portions 152 or the extension directions of the joining portions 152 may be arbitrarily set.

INDUSTRIAL APPLICABILITY

It is possible to provide the conveyor belt and the conveyor belt device in which rupture in the joining portion of the loop coil can be decreased in a state where a vertical tear is not generated in the main body rubber.

REFERENCE SIGNS LIST 1A to 1D: conveyor belt device
13A to 13D: conveyor belt
14: main body rubber
14a: bottom wall portion
14b: side wall portion
14c: bent portion
15A to 15D: loop coil
15a: longitudinal portion
15b: width portion
17: transport object
20: vertical tear detection means
21: magnetic field generation portion
22: detection portion
H: belt width direction
L: belt longitudinal direction
a: deflection width
$\lambda$: pitch
T: protrusion amount

The invention claimed is:

1. A conveyor belt, comprising:
a main body rubber which extends in a belt longitudinal direction; and
a loop coil which is embedded in the main body rubber and has a rectangular annular shape in a plan view when viewed in a belt thickness direction,
wherein the loop coil includes a plurality of wire portions which extend in the plan view and form an outer perimeter of the loop coil and in which end portions of adjacent wire portions are joined to each other via a joining portion, a pair of longitudinal portions which extend in the belt longitudinal direction, and a pair of width portions which extend in a belt width direction,
wherein a plurality of joining portions are disposed in the plan view, and the number of the joining portions disposed in the longitudinal portion of the loop coil is greater than the number of the joining portions disposed in the width portion of the loop coil, and
wherein the joining portions extend in directions intersecting a width direction of the rectangular annular shape in a plan view when viewed in the belt thickness direction.

2. The conveyor belt according to claim 1,
wherein both end portions of the wire portion are twisted in the joining portion and the joining portion extends in a direction intersecting the direction which extends in the plan view.

3. The conveyor belt according to claim 2,
wherein in the loop coil, a length of the longitudinal portion is shorter than a length of the width portion in the plan view.

4. The conveyor belt according to claim 2,
wherein the joining portion is disposed in both of the pair of longitudinal portions.

5. The conveyor belt according to claim 2,
wherein the joining portion is disposed in the vicinity of an outer end portion of the width portion in the belt width direction.

6. The conveyor belt according to claim 2,
wherein in the width portion, the vicinity of a center portion of the conveyor belt in the belt width direction is disposed in the belt width direction, and
wherein the joining portion is disposed in a portion of the width portion which is positioned in the vicinity of the center portion of the conveyor belt in the belt width direction.

7. The conveyor belt according to claim 2,
wherein a wave shape of the wire portion has a deflection width, and a ratio of the deflection width to a pitch is 0.31 or more.

8. The conveyor belt according to claim 2,
wherein the main body rubber includes a pair of side wall portions which are positioned on both sides in the belt width direction, a bottom wall portion which is positioned between the pair of side wall portions, and a bent portion which connects the side wall portion and the bottom wall portion, and the main body rubber is used such that a transport object is loaded in a state where the side wall portion gradually extends vertically upward from the inside in the belt width direction toward the outside, and wherein the joining portion is disposed in a portion of the main body rubber which avoids the bent portion.

9. The conveyor belt according to claim 1, wherein in the loop coil, a length of the longitudinal portion is shorter than a length of the width portion in the plan view.

10. The conveyor belt according to claim 9, wherein the joining portion is disposed in both of the pair of longitudinal portions.

11. The conveyor belt according to claim 9, wherein the joining portion is disposed in the vicinity of an outer end portion of the width portion in the belt width direction.

12. The conveyor belt according to claim 1, wherein the joining portion is disposed in both of the pair of longitudinal portions.

13. The conveyor belt according to claim 1, wherein the joining portion is disposed in the vicinity of an outer end portion of the width portion in the belt width direction.

14. The conveyor belt according to claim 1, wherein in the width portion, the vicinity of a center portion of the conveyor belt in the belt width direction is disposed in the belt width direction, and wherein the joining portion is disposed in a portion of the width portion which is positioned in the vicinity of the center portion of the conveyor belt in the belt width direction.

15. The conveyor belt according to claim 1, wherein a wave shape of the wire portion has a deflection width, and a ratio of the deflection width to a pitch is 0.31 or more.

16. The conveyor belt according to claim 1, wherein the main body rubber includes a pair of side wall portions which are positioned on both sides in the belt width direction, a bottom wall portion which is positioned between the pair of side wall portions, and a bent portion which connects the side wall portion and the bottom wall portion, and the main body rubber is used such that a transport object is loaded in a state where the side wall portion gradually extends vertically upward from the inside in the belt width direction toward the outside, and wherein the joining portion is disposed in a portion of the main body rubber which avoids the bent portion.

17. The conveyor belt according to claim 1, wherein the wire portions annularly extend while being bent and exhibit a wave shape in the plan view.

18. A conveyor belt device, comprising:

the conveyor belt according to claim 1;

a magnetic field generation portion which generates a magnetic field which generates induction current in the loop coil; and a detection unit which detects the induction current generated in the loop coil.

19. A conveyor belt device, comprising:

the conveyor belt according to claim 2;

a magnetic field generation portion which generates a magnetic field which generates induction current in the loop coil; and a detection unit which detects the induction current generated in the loop coil.

\* \* \* \* \*